United States Patent [19]
Edelstein

[11] Patent Number: 5,149,104
[45] Date of Patent: Sep. 22, 1992

[54] VIDEO GAME HAVING AUDIO PLAYER INTERATION WITH REAL TIME VIDEO SYNCHRONIZATION

[76] Inventor: Elissa Edelstein, 343 Cardinal Mediros Ave., Cambridge, Mass. 02141

[21] Appl. No.: 651,314

[22] Filed: Feb. 6, 1991

[51] Int. Cl.⁵ .............................................. A63F 9/22
[52] U.S. Cl. .................................... 273/434; 273/437; 273/438; 273/DIG. 28; 340/723; 434/185
[58] Field of Search ............... 273/434, 435, 436, 437, 273/438, DIG. 28, 85 G, 313; 364/410; 434/307, 308, 323, 112, 185; 340/706, 723, 724

[56] References Cited

U.S. PATENT DOCUMENTS

| | | | |
|---|---|---|---|
| 4,305,131 | 12/1981 | Best | 434/323 |
| 4,342,454 | 8/1982 | Baer et al. | 273/85 G |
| 4,445,187 | 4/1984 | Best | 434/323 |
| 4,477,069 | 10/1984 | Crudgington, Jr. | 273/85 G |
| 4,521,014 | 6/1985 | Sitrick | |
| 4,572,509 | 2/1986 | Sitrick | 273/85 G |
| 4,630,301 | 12/1986 | Hohl et al. | |
| 4,695,953 | 9/1987 | Blair et al. | 273/85 G |
| 4,710,873 | 12/1987 | Breslow et al. | 273/85 G |
| 4,884,972 | 12/1989 | Gasper | 434/185 |

FOREIGN PATENT DOCUMENTS 3238933  4/1984  Fed. Rep. of Germany ... 273/85 G

Primary Examiner—Theatrice Brown
Assistant Examiner—Jessica J. Harrison
Attorney, Agent, or Firm—Wolf, Greenfield & Sacks

[57] ABSTRACT

The video game system is configured so that when a player speaks, a video object representing the player in the video game is synchronized with the player's speech in real-time. The audio output is transmitted from the video display unit and is thus associated with having come from the image rather than from the player. The synchronization is accomplished by matching the loudness of syllables in the player's speech with the facial expression of the video object. This video game system includes an audio input means for receiving audio input from a player as well as a video display for displaying video images. Further, the video system includes a data processing means that is programmed to generate and coordinate the activity of the video game. Each player may be provided with a headset that includes a microphone and earphones to facilitate player interaction and interaction with the video game system. The video game system may also include a distortion means for distorting the audio output to reflect the nature of a player's video object. The video game system also provides a method for storing video/audio information for retrieval and play back.

17 Claims, 4 Drawing Sheets

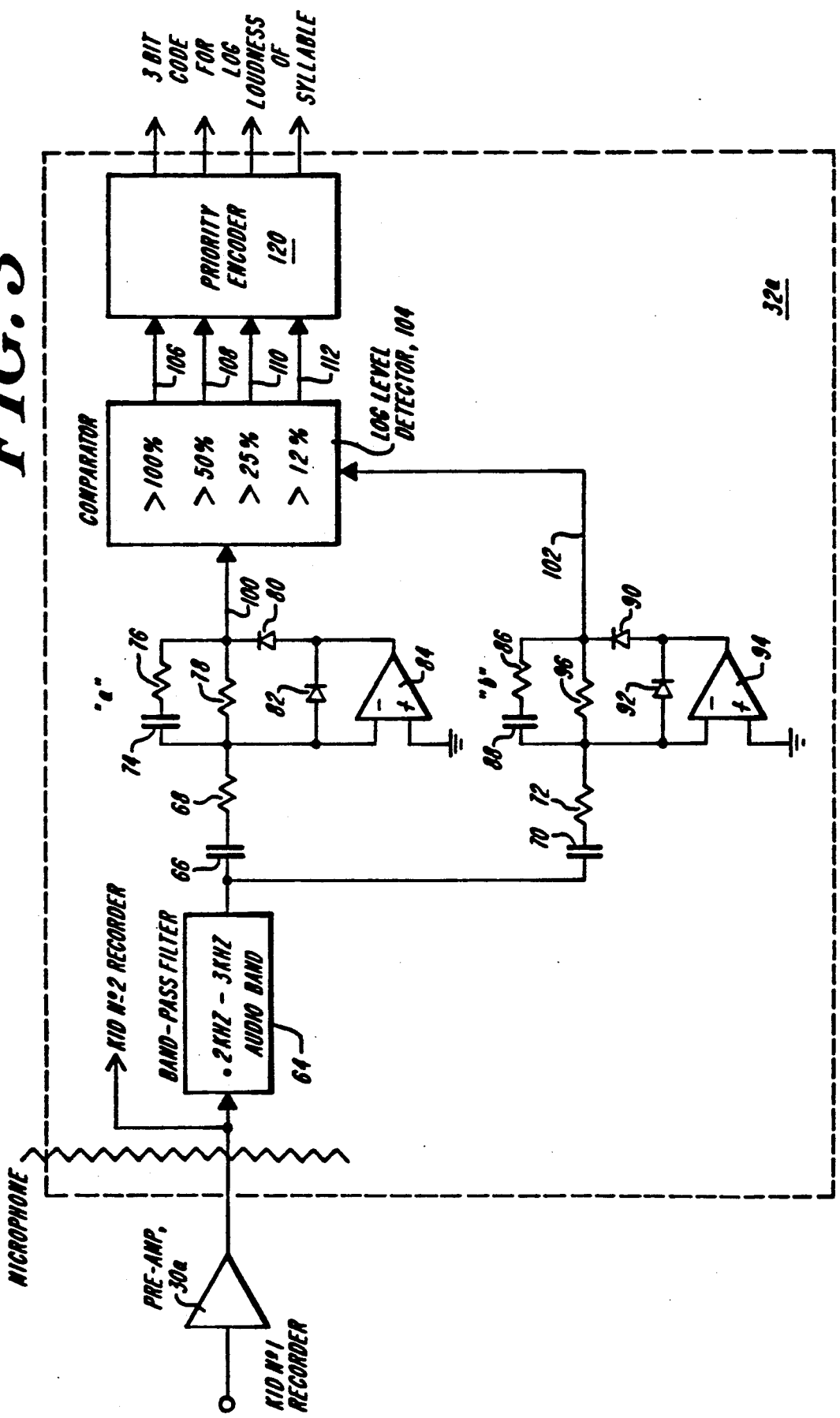

VIDEO GAME HAVING AUDIO PLAYER INTERATION WITH REAL TIME VIDEO SYNCHRONIZATION

FIELD OF THE INVENTION

The present invention relates generally to a video game system and more particularly, to a video game system that encourages audio interaction between players through the video game system.

BACKGROUND OF THE INVENTION

In a typical video game system, a player's interaction with the video game system is limited to the scope of interaction provided by a device such as a keypad, mouse or joystick. These devices generally enable a player to manipulate a playing piece positioned on a video display of the system. The range of activities facilitated by such devices include moving the player piece, firing or throwing certain objects or selecting particular options. The player's interaction with the video game system, however, does not extend beyond the limited options provided through the device. Moreover, a player is usually limited with regard to the playing piece he selects. In many systems every player has the same playing piece. Furthermore, in most systems, only a single player may play the system at a given point in time.

It is, therefore, an object of the present invention to encourage audio interaction between players of a video game system through the video game system.

It is a further object of the present invention to synchronize a visual response with audio input provided from a player of a video game.

It is still another object of the present invention to have the sequence of play of a video game dictated by the interaction between players of the video game.

SUMMARY OF THE INVENTION

A video game system synchronizes audio input from a player with a video display. In particular, the video game system allows a player to select a video object that is displayed on a video display such that the object mimics the speaker when the player speaks. The mimicking of the player's speech is dictated by the level of loudness of the player's speech. Hence, if a player yells, his video object also appears to yell. The video game system includes an audio input device for receiving audio input from a player of the video game. It also includes a data processor that is programmed to generate and coordinate activity of the video game. The data processor provides video objects for each of the players which represents the respective player in the video game. This video object for a player is selected from a set of video objects available for the video game. Different video games may have different available objects.

Preferably, the audio input device is a microphone that is integrated into a headset along with a pair of earphones. Each player of the video game is preferably provided with his own headset. The video game system may also include a distorter that distorts the audio output in accordance with the video object that a player has chosen. For instance, if a player chooses a sheep as his video object, the output speech is distorted to sound similar to a sheep. Still further, the video game should include a video positioning controller for positioning a player's video object on the video display system. This control may take conventional forms such as a joystick or a mouse. It is preferred that the sequence of play of the video game be dictated by how the video object is positioned in relation to the other player's object on the video display using these controls.

The video game system may also enable players to play back previously recorded sessions of a video game. To facilitate such an ability, the video game system includes a game play back system and a game recording system. When one desires to play back a particular game, the system retrieves the recorded audio and video information and plays it back to observers.

BRIEF DESCRIPTION OF THE DRAWINGS

FIG. 3 is a schematic diagram of the loudness unit depicted in FIG. 2.

DETAILED DESCRIPTION OF THE PREFERRED EMBODIMENT

Figure 1:
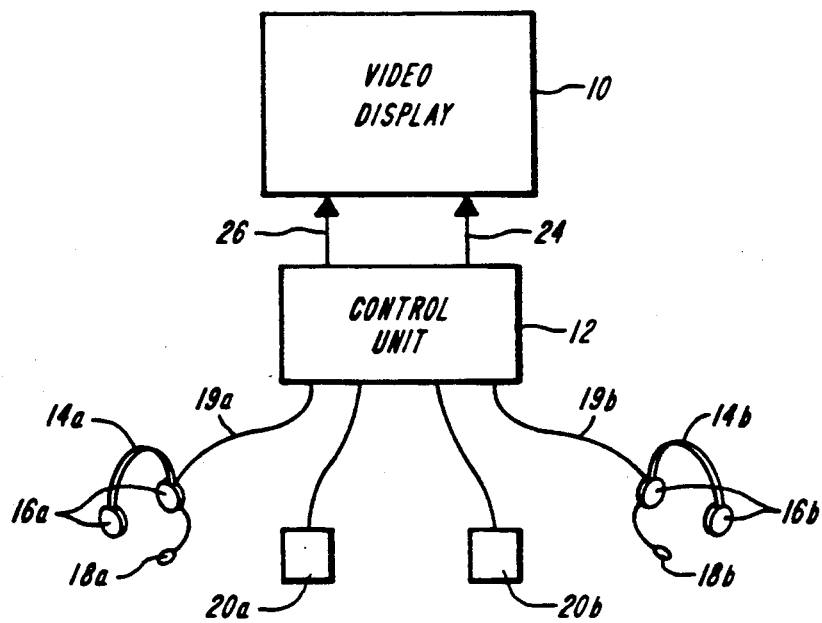
FIG. 1 is a block diagram of components of the video game system.

A preferred embodiment of the video game system of the present invention is depicted in FIG. 1. The video game system is provided with a video display 10 for displaying video images during playing of a video game. The video display 10 may take several forms, including a television or a cathode ray tube (CRT) display. The video images shown on this video display 10 are generated by a control unit 12 in response to player activity. In particular, the control unit 12 contains a data processor programmed to execute software programs that respond to player activity. Such software programs determine the video output 24 that is forwarded from the control unit 12 to the video display 10. The software may be contained within the control unit 12, or alternatively, it may be contained within a cartridge that is inserted into the control unit 12 such as known in the prior art. The system is capable of executing numerous different video games. Each of these video games has a software program uniquely associated with it that enables the system to perform the game. The hardware of the system is not altered to play different games; rather, a different software program is run for each different game.

The control unit 12 also forwards electrically encoded audio information 26 to the video display unit 10. The audio information 26 originates from players of the video and is initially received by a headset 14a and 14b provided to each player. The headsets 14a and 14b includes a microphone 18a and 18b that captures the player's speech during play of the video game. The speech is translated into electrically encoded audio input that travels down cable 19a and 19b to the control unit where it is processed and forwarded to the video display 10. It should be appreciated that the microphone need not be embodied in a headset; rather a free standing microphone is equally viable.

The headsets also include earphones 16a and 16b through which each player hears audio information received from other players. Hence, the video game system is designed so that players interact but the audio portion from each player is identified with the character/image shown on the video display unit. Each player listens to the other player during course of the video game. Only two headsets are shown in FIG. 1. Nevertheless, it should be appreciated that the use of two headsets is merely illustrative, for greater than two players may participate with this video game system. In general, each player of the game has a headset.

The video game system also includes player position controls 20a and 20b. These controls may be devices known in the prior art such as mouses, joy sticks or light pens. As will be explained in more detail below, each of these control devices is used to move a video object associated with a player on the video display 10. The movement of the video objects in relation to each other, dictates the sequence of activity in the video game and ultimately the final outcome of the game.

The video game system of the preferred embodiment enables each player of the game to select a particular video object that acts as the player's piece within the video game. This piece is movable on the video display 10 through the player position controls 20a and 20b. The player object may take many forms. For example, if the video game is a game that takes place in a farm setting, the players may choose a farm animal as their playing piece. The video game is programmed to provide a select number of choices of player pieces. Hence, one player may choose a cow, another player may choose a chicken and so forth.

The video object selected by a player responds to audio input received from that player through his microphone 18a and 18b. In particular, when a player speaks into his microphone 18a and 18b, the video object is altered so that it appears to be speaking in synchronization with the audio input. The details of how this synchronization is done will be given below. Furthermore, the resulting audio output received by the players in their headphones 14a and 14b may be distorted so as to reflect the nature of the selected video object. In the farm example given below, if a player had chosen a cow as his video object, the audio output heard by the other player is distorted to sound like a cow. The details of the electronic circuitry used to realize this effect is, likewise, reserved for the discussion below.

Figure 2:
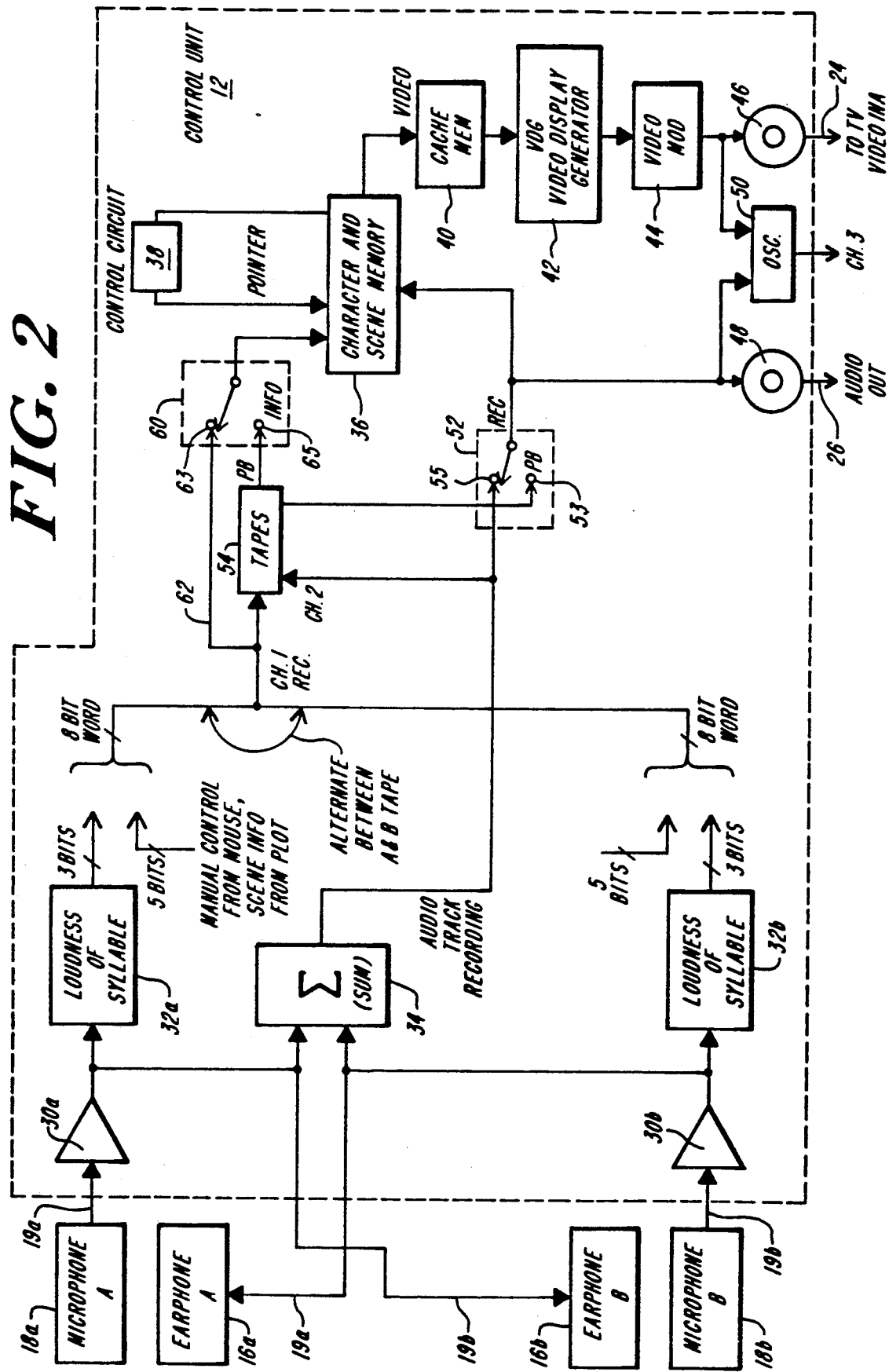
FIG. 2 is a more detailed block diagram of the control unit of FIG. 1.

FIG. 2 presents a more detailed depiction of the control unit 12. To explain the components of the control unit 12, it is helpful to follow the path of audio input received from a single player. Hence, suppose that audio input is received by a microphone 18a. This audio input passes to the control unit via cable 19a. The audio input first enters a preamplifier 30a that boosts the level of the audio input. The amplified audio input then enters a signal processing circuit unit 32a that ultimately determines the loudness of syllables in the audio input. The final output of unit 32a produces three bits of data information that indicate an appropriate level of loudness. These three output bits are combined with five additional bits provided from the position control means 20a to form an eight bit word. The five bits dictate the movement of the player's video object on the video display 10.

The amplified audio input also passes to a summer 34 that sums the audio input from microphone 18a and the audio input from microphone 18b (i.e. the audio input from the respective players). Moreover, the amplified audio input from each player (i.e. from microphones 18a and 18b) is passed to the earphones 16a and 16b of the other players. For instance, input received from microphone 18b is forwarded to earphone 16a of the other player. Likewise, the amplified input from microphone 18a is forwarded to the earphone 16b.

The video game system of the present invention can operate in one of two modes. When the video game system is operating in the active mode, the current activity of the players dictates the sequence of the video game. However, this system can also operate in a playback mode wherein none of the players are actively participating in the game; rather a previously audio/video recorded session of a game is played back. For purposes of explaining the additional components of the control unit 12, it is useful, initially, to assume that the system is operating in the active mode.

When operating in the active mode, the eight bit words from the respective players, travel towards a set of recording tapes 54. The control unit 38 employs clocking circuitry and switches (not shown) such as known in the prior art so that the eight bit words from the players are stored in an interleaved fashion. The eight bit words also travel to the character and scene memory 36. The control unit 38 utilizes a switch 60 (shown in phantom form) which switches between an active contact 63 and a playback contact 65. When in the active mode, the active contact 63 is contacted by the switch 60. This causes the eight bit codes to be forwarded to the character and scene memory 36. The character and scene memory also receive information from the summed audio inputs that originate from the summer 34. These inputs pass through a switch 52 which has a record contact 55 and a playback contact 53. When the system is in the active mode, the record contact 55 is contacted by the switch 52. This allows the summed audio input to travel along a path to the character and scene memory 36.

In general, the character and scene memory is utilized to store the visual characteristics of the video images that are displayed on the video display 10. These visual images can then be retrieved to generate a playback of the game. One approach to retrieval for playback is to use a software look up table that prompts the ROM to recreate the recorded scenes. The character and scene memory 36 may be realized as one of many different types of hardware. For instance, it may be a memory disc or alternatively, it may be a video recording tape. Still further, the character and scene memory 36 may be a read only memory (ROM) holding for example, one megabyte of memory. One megabyte of memory should generally be sufficient to hold a 20-30 minute sequence of images. One megabyte memory size is merely illustrative. The memory size is dictated by the memory requirements of the software used.

A control circuit 38 comprising a four bit microprocessor retrieves the video data from the character and scene memory 36. This control processor 38 is under the control of the software program that executes the video game. The resulting video output travels from the memory 36 to a video cache memory 40. A video display generator 42 retrieves the video data from the cache memory 40 and forwards it to a video modulator 44 which modulates the data into a video carrier wave. The resulting modulated output passes to an output port 46 wherein it is forwarded as the video information 24 to the video display 10. The output also travels to the video/audio RF (radio frequency) encoder 50.

The summed audio output from the summer 34 travels to an audio output port 48 where it is output a audio data 26 to the video display 10. It should also be appreciated that the audio output travels back to the headsets of the players excluding the originator of that audio output. Furthermore, the audio signals travel to the encoder 50 which is coupled to the channel selection device so that the information is at the proper frequencies to be received by channel 3 of the video display.

As mentioned above, the loudness of syllables spoken by each of the players is measured, and a three bit code is generated by processing unit 32a for each syllable reflecting the loudness of the syllable. A more detailed depiction of the signal processing unit 32a is given in FIG. 3. The processing unit 32a operates as follows. The audio input exits the preamplifier 30a and passes to a band pass filter 64. This filter removes noise and only allows the audio band to pass through it. The pass band of this filter is preferably selected to pass a portion of the audio band in the range of 0.2 kilohertz to 3.0 kilohertz. The filtered signal then is passed to two separate circuits denoted a "a" and "b" in FIG. 3. The top circuit "a" can be described as following the "voice envelope" and the "b" circuit as following the "word volume".

The "a" circuit follows the voice envelope of the audio input and produces an output 100 indicative of the syllabic rate of the input (i.e. the number of syllables per time). The "a" circuit is comprised of capacitor 66, resistor 68, capacitor 74, resistor 76, resistor 78, diode 80, diode 82 and an operational amplifier 84. The capacitor 66 preferably has a capacitance of approximately 0.01 microfarads. The capacitor serves primarily as a filtering mechanism to remove noise from the circuit. A resistor 68 and a resistor 78 have resistances of approximately 82 kilohms and 100 kilohms, respectively. These resistances are selected to set the gain approximately equal to 1. Further, the capacitor 74 preferably has a capacitance of approximately 1 microfarad, and the resistor 76 has resistances of approximately 10 kilohms. Given the resistance of the resistor 78, the attack time of this circuit is approximately 10 milliseconds, whereas the decay time is approximately 100 milliseconds. The diodes 80 and 82 serve to rectify the incoming signal. Overall, this circuit serves to follow the voice envelope.

Circuit "b" is similar to the circuit "a" except that the resistance of the resistors 72, 86 and 96 and the capacitance of capacitor 70 differ from their counterparts in circuit "a". These values are selected to establish a different attack time and a decay time than realized by circuit "a". The capacitor 70 has a capacitance of 0.001 microfarads, and it is positioned in series with the resistor 72 which has a resistance of 820 kilohms. The resistor 96 has a resistance of approximately 1 megaohms which is ten times larger than the resistance of the corresponding resistor 78 in the "a" circuit. Furthermore, resistor 86 has a resistance of 100 kilohms and capacitor 88 has a capacitance of approximately 1 microfarads. The additional resistance of resistors 86 and 96 alters the circuit so that the attack time is approximately 100 milliseconds and the decay time is approximately 1 second. The "b" circuit also includes rectifiers 90 and 92 and an operational amplifier 94. The non inverting input of the operational amplifier is tied to ground. The output 102 from this circuit follows the word rate of the input.

The outputs 100 and 102 enter a comparator 104. The primary role of the comparator is to compare the syllabic rate indicated by output 100 to the word rate indicated by output 102. The comparator 104 is a logarithmic level detector that compares on a log basis, the logarithmic level of the respective outputs 100 and 102. It produces four outputs 106, 108, 110 and 112 indicative of the percentage of the output 100 relative to the output of 102. Specifically, output 106 indicates whether output 100 is greater than output 102. Likewise, output 108 indicates whether output 100 is greater than fifty percent of the output 102; output 110 indicates whether output 100 is greater than twenty-five percent of the output 102; and output 112 indicates whether output 100 is greater than twelve percent of output 102.

Figure 4:
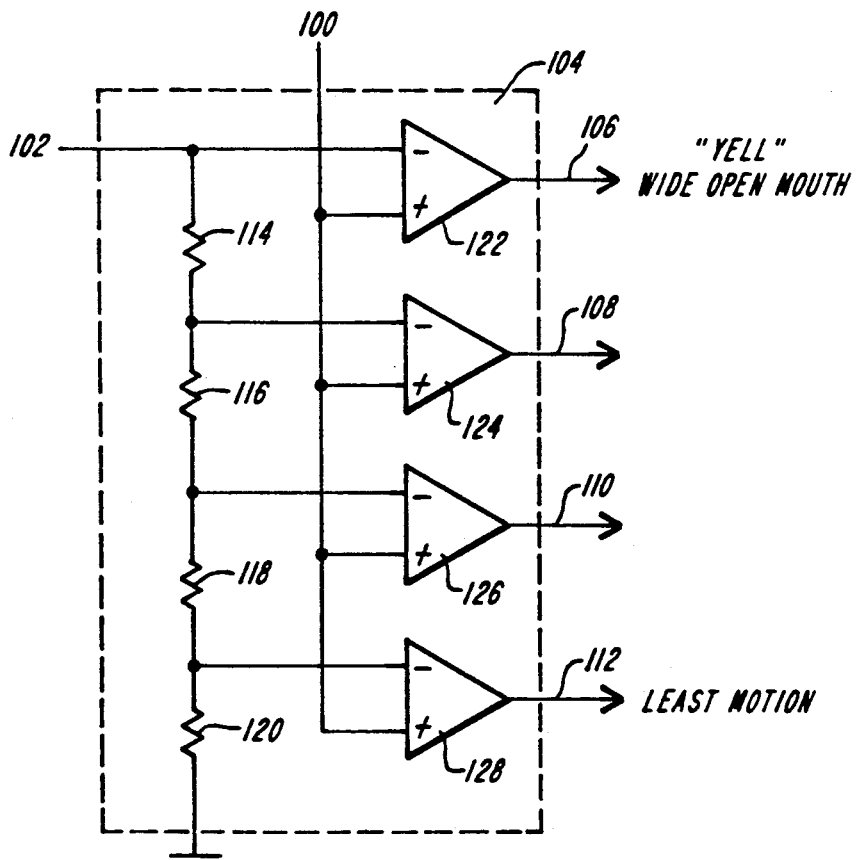
FIG. 4 is a schematic diagram of the comparator of FIG. 3.

FIG. 4 depicts one possible implementation of the circuitry necessary to implement the log level detector 104. Specifically, the detector 104 includes four comparators 122, 124, 126 and 128 and four resistors 114, 116, 118 and 120. Resistor 114 has a resistance of 8 kilohms, whereas resistor 116 has a resistance of 4 kilohms. Furthermore, resistor 118 has a resistance of 2 kilohms and lastly resistor 120 has a resistance of 1 kilohms. These resistors are utilized to establish the level of the output 102 that is compared with the output 100 by the comparators 122, 124, 126 and 128. Comparator 122 compare the output 100 with the full non-attenuated level of the output 102. This output indicates whether output 100 is greater than output 102 (as described above). The comparator 124, however, compares the input 102 with the output 100 after output 102 has passed through the resistor 114. This resistor 114 serves to attenuate the level of the output 102. As a result, the comparator 124 makes a comparison of whether the signal of output 100 is greater than fifty percent of the output 102. Similarly, the output 102 must pass through resistor 114 and 116 (8 Kohms +4 Kohms) before being compared by comparator 126, and the output 102 must pass through resistors 114, 116 and 118 (8 Kohms +4 Kohms +2 Kohms) before passing through comparator 128.

Figure 5A:
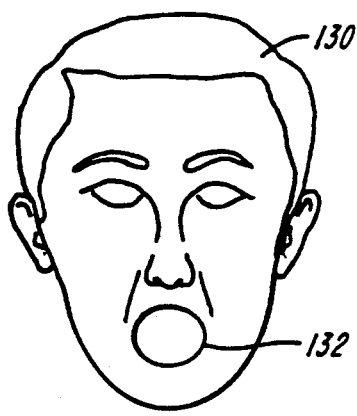
FIGS. 5a, 5b, 5c and 5d depict different player video object mouth positions.
Figure 5B:
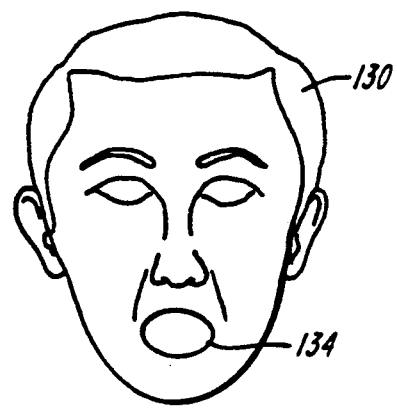
Figure 5C:
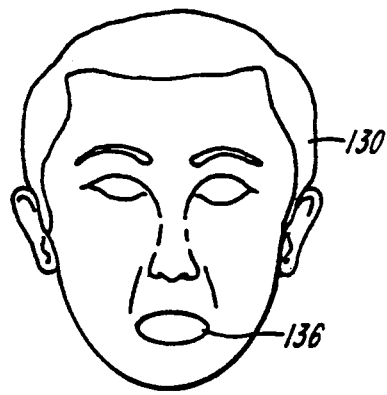
Figure 5D:
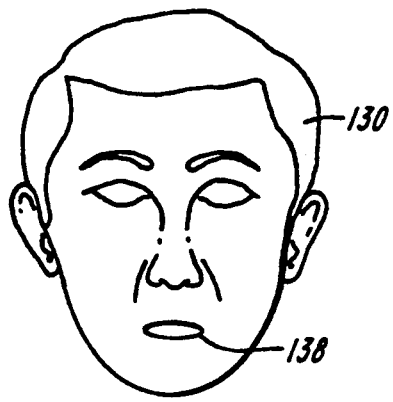

Before output lines 106, 108, 110 and 112 are input to the priority encoder 120, the log level detector 104 translates these output lines on a log basis to produce the logarithmic loudness of each output. The priorty encoder 120 now can output the processed frame of audio input as a three bit code. A three bit code is used because an 8 bit to 3 bit encoder is employed. As mentioned above, these three bits are combined with five other bits to form an eight bit word. The three bits are utilized in fetching the video image to be displayed in the character and scene memory 36 because different loudness levels correspond with different mouth positions. In particular, the louder the syllable in the audio input, the more open the mouth position of the player's video object. FIGS. 5a, 5b, 5c and 5d illustrate such mouth positions. In FIG. 5a, the output 100 is greater than the output 102. As such, it is presumed that the input corresponds to a yell. In this instance, the players mouth assumes a wide open position 132. In contrast, in FIG. 5b, output 100 is only greater than fifty percent of output 102. The audio input is therefore, not as loud and hence, the mouth position 134 is half that of the mouth position 132 in FIG. 5a. Likewise, FIGS. 5c and 5d are depictive of the mouth position 136 and 138 wherein the output 100 is only greater than twenty five percent of the output 102 and greater than twelve percent of the output 102, respectively.

The above description is applicable for when the system is operating in recording mode. However, when it is operating in playback mode, the switch 63 (FIG. 2) is in contact with the playback contact 65 and the switch 52 is in contact with the playback switch 53. This causes the eight bit words and summed audio input to be transmitted from the tapes 54 as opposed to receiving the transmission from the players. Moreover, the video images recorded in synchronization with such audio input and eight bit words is retrieved from the character and scene memory. This information then passes through the subsequent components to the video display 10 which operates in a fashion as previously described. Thus, players can play back a game after they have finished playing it. This serves as an archival mechanism for preserving games in which players have participated.

It should be appreciated that the games may be organized so that the sequence of video images is dictated by the player movement as opposed to the audio inputs. The player movement is in response to the position control means 20a and 20b (FIG. 1). As an example, suppose that several options are available to the players at a given point in a video game. In particular, the players may move towards each other, away from each other or move in unison together. Depending on which one of these three movement options is followed, a subsequent video image is produced that is unique to that option. For example, if the players move towards each other, a bright sun might appear on the video display. In contrast, if the players moved away from each other, it might begin raining. Lastly, if the players move together, the scene might reflect a partly cloudy weather pattern. This example is merely provided for illustrative purposes. The options used are largely a product of the software of the video game.

The benefits of the above-described approach are multifold. In particular, it puts the control of the video game into the player's hands and the player can learn from such interaction. Such a game format emphasizes a player's creativity and imagination in an interactive setting with another player. The video system allows players to directly interact with each other in an audio fashion unlike any current video games. Still further, the system enables role playing which is useful for educational and counseling purposes. The player of the game more naturally identifies with the video object that he selects because it is his voice associated with an image he is controlling. In sum, this video game system greatly expands the scope of available video games by emphasizing role playing and player to player interaction, rather than player to computer interaction.

While the present invention has been described with reference to a preferred embodiment thereof, those skilled in the art will understand various changes in form and detail that do not depart from the spirit and scope of the invention as defined in the appended claims.

I claim:

1. A video game system, comprising:
   a) an audio input means for receiving audio input from a player of a video game; and
   b) a video display for displaying video images of the video game;
   c) data processing means programmed to generate and coordinate activity of a video game, said data processing means including
      1) means for providing a video object on said video display which represents said player in the video game;
      2) means for synchronizing the audio input received from the player through the audio input means with the video object of the player so that the video object mimics speaking in a fashion synchronized with said audio input.

2. A video game system as recited in claim 1 wherein the loudness of the audio input affects how the video object mimics speakers.

3. A video game system as recited in claim 1 wherein said audio input means comprises a microphone.

4. A video system as recited in claim 1 wherein said audio input means is integrated into a headset that is worn by the player.

5. A video game system as recited in claim 1 further comprising an audio output means for outputting the audio to said player.

6. A video game system as recited in claim 5 wherein the audio output means is integrated into a headset along with the audio input means.

7. A video game system as recited in claim 1 further comprising a distortion means for distorting the audio received from the player to produce distorted audio output that reflects the video object associated with the player.

8. A video game system as recited in claim 1 further comprising video positioning means for allowing the player to position and move his video object on said video display.

9. A video game system as recited in claim 8 where sequence of play of the video game is dictated by how the video object is positioned in relation to the other video objects on the video display using the means for positioning.

10. In an interactive video game system for use by a first player and a second player simultaneously, said video game system having means for displaying video images, the improvement comprising:
    first means for receiving first audio information generated by said first player and transmitting said first audio information to said second player;
    second means for receiving second audio information generated by said second player and transmitting said second audio information to said first player; and
    means responsive to said first audio information and to said second audio information for controlling said video information display means to manipulate said video images so that said first player perceives in real time that said second audio information originates from said video images . and said second player perceives in real time that said first audio information originates from said video images.

11. In an interactive video game system, the improvement according to claim 10 wherein said first receiving and transmitting means comprises means for excluding substantially all audio information other than said first audio information from said second player.

12. In an interactive video game system, the improvement according to claim 10 wherein said first receiving and transmitting means comprises means for distorting said first audio information after said first audio information is received from said first player and before said first audio information is transmitted to said second player.

13. In an interactive video game system for use by a first player and a second player simultaneously, said video game system having means for displaying video images, first means operable by said first player for manipulating a first video image and second means operable by said second player for manipulating a second video image, the improvement comprising:

means for receiving first audio information from said first player and transmitting said first audio information to said second player;

means for receiving second audio information from said second player and transmitting said second audio information to said first player;

means responsive to said first audio information and to said second audio information for controlling said video information display means to manipulate said first and second video images so that said first player perceives that said second audio information originates from said second video image and said second player perceives that said first audio information originates from said first video image.

14. In an interactive video game system, the improvement according to claim 13 wherein said controlling means controls said video display means so that said first video image is responsive to a loudness level of said first audio information.

15. In a video game system, a method of player interaction with the video game comprising the steps of:
a) assigning a video object to each player of the video game, said video object being selected from a set of video objects provided by said video game;
b) receiving audio input from each said player;
c) determining the loudness of said audio input; and
d) altering the video object so that it appears that the video object of the players appears to speak in synchronization with the audio input in a fashion reflecting the determined loudness of said audio input.

16. A method as recited in claim 15 further comprising the step of distorting the audio output based on what video object said player selected.

17. A method as recited in claim 15 further comprising the step of altering the video object for each player so that it appears that the video object speaks in synchronization with audio input from the player in a fashion reflecting loudness of the audio input.

* * * * *